United States Patent [19]

Maekawa et al.

[11] 4,286,804
[45] Sep. 1, 1981

[54] SEAT-BELT SYSTEM

[75] Inventors: Naozane Maekawa, Toyokawa; Takeshi Awano, Okazaki, both of Japan

[73] Assignee: Mitsubishi Jidasha Kogyo Kabushiki Kaisha, Japan

[21] Appl. No.: 74,123

[22] Filed: Sep. 10, 1979

[30] Foreign Application Priority Data

Sep. 12, 1978 [JP] Japan .............................. 53-111923
Nov. 8, 1978 [JP] Japan .............................. 53-137476

[51] Int. Cl.³ .............................................. B60R 21/10
[52] U.S. Cl. .................................... 280/803; 280/804; 280/806
[58] Field of Search ............... 280/802, 803, 804, 807, 280/808; 297/469, 473, 474, 475, 476, 477, 478, 482, 483, 486

[56] References Cited

U.S. PATENT DOCUMENTS

| 3,680,883 | 8/1972 | Keppel et al. | 280/804 |
| 3,882,955 | 5/1975 | Kaneko et al. | 280/804 |
| 3,995,884 | 12/1976 | Bauer et al. | 280/804 |
| 4,070,038 | 1/1978 | Bergman | 297/482 |

FOREIGN PATENT DOCUMENTS 2552862 6/1976 Fed. Rep. of Germany ........... 280/804
2724818 12/1978 Fed. Rep. of Germany ........... 297/469

Primary Examiner—Joseph F. Peters, Jr.
Assistant Examiner—Randall A. Schrecengost
Attorney, Agent, or Firm—Robert E. Burns; Emmanuel J. Lobato; Bruce L. Adams

[57] ABSTRACT

A seat-belt system for a vehicle, automatically restraining and releasing the driver or a passenger in response to the closing and opening of the door, respectively, which system comprises a hip belt with one end thereof connected to a hip-belt anchor fixed near the center side of the seat and the other end wound around a hip-belt retractor fixed to the lower rear of the door through a run-through member slidably guided on the door, a shoulder belt with one end thereof connected to a shoulder-belt anchor slidably guided along a roof rail above the seat and other end wound around a shoulder-belt retractor fixed near the center side of the seat, and a driving mechanism adapted to function on sensing the closing and opening of the door so as to move the run-through member and the shoulder-belt anchor to the restraining and non-restraining position, respectively, whereby the seat-belt system securely holds the driver or the passenger in position when the door is closed and releases him or her from the seat to get on and off the car when the door is opened, with a minimum of offensiveness to the visual and tactual senses.

41 Claims, 25 Drawing Figures

F I G. 18
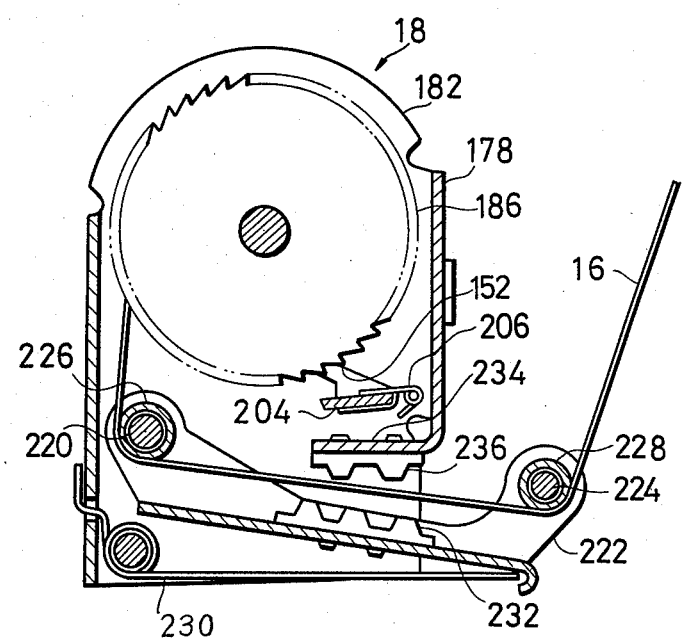
F I G. 19
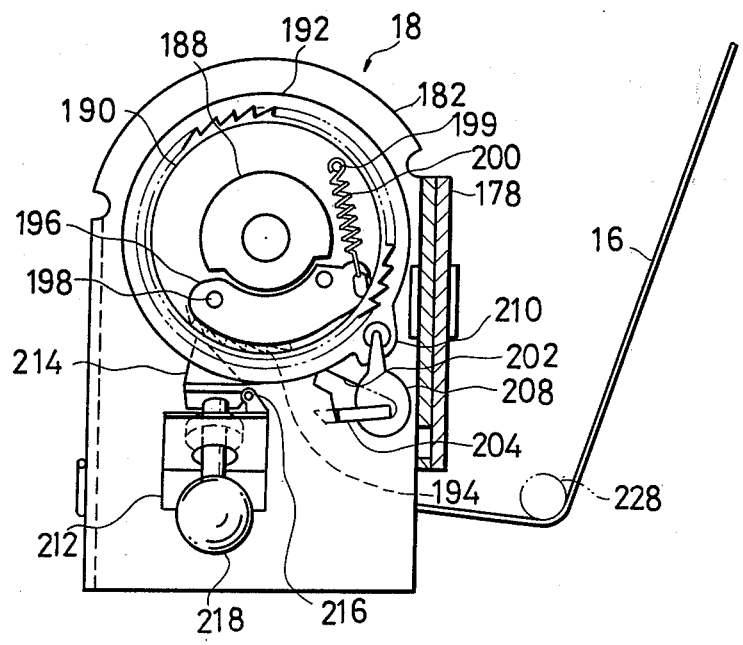

F I G. 24
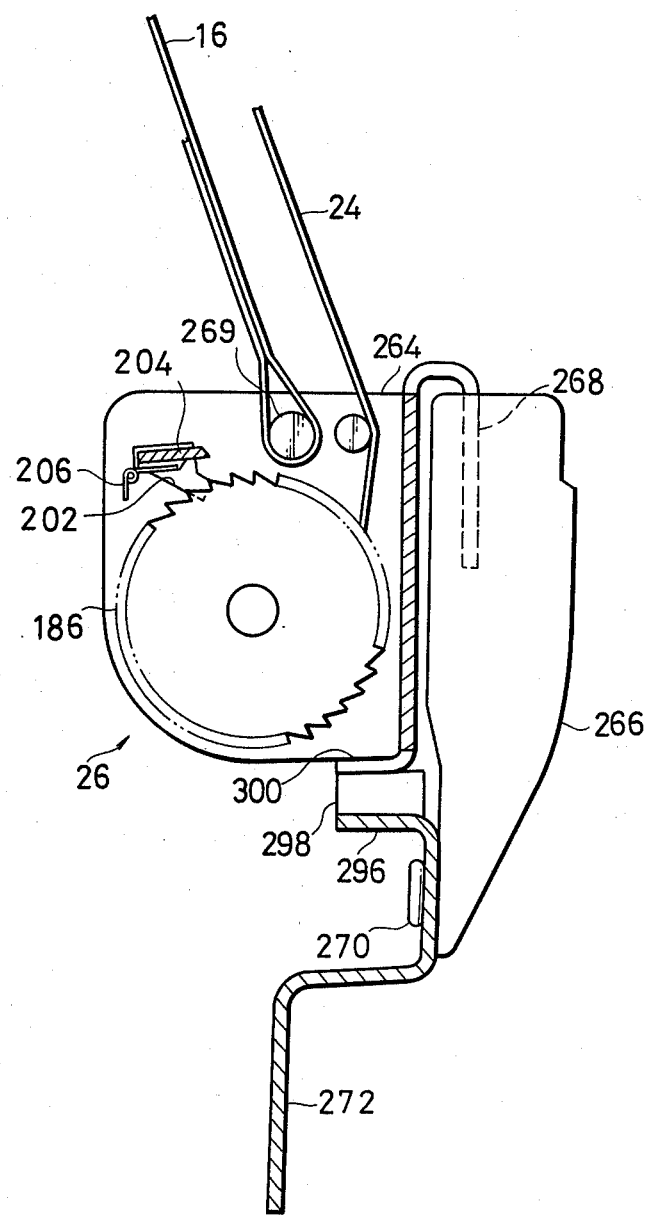

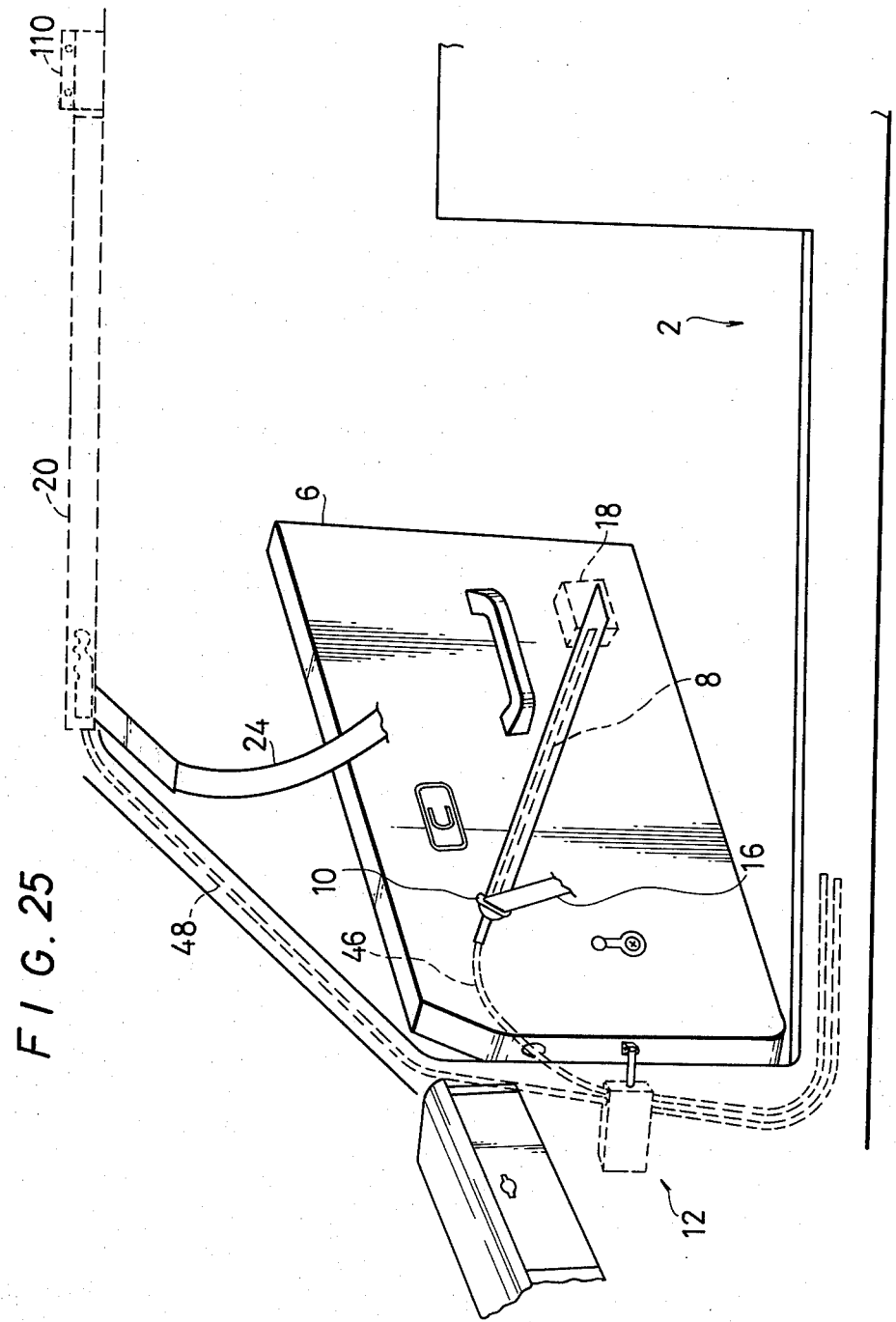

4,286,804

SEAT-BELT SYSTEM

BACKGROUND OF THE INVENTION

This invention relates to improvements in a seat-belt system. Various types of seat-belts have been in use for protecting the driver and passengers from injury or death in case of a collision. A more recent development in this field is passive seat-belt systems in which a seat-belt automatically shifts into the restraining and non-restraining positions as the door is closed and opened. The object of this invention is to provide a seat-belt system in which a seat-belt automatically moves into a non-restraining position to permit the driver or a passenger to get into and out of the car when the door is opened, with a minimum of offensiveness to the visual and tactual senses, and into a restraining position to securely hold him or her in position when the door is closed.

BRIEF DESCRIPTION OF THE DRAWINGS

Now embodiments of this invention will be described by reference to the accompanying drawings, in which:

FIG. 18 is a cross-sectional view taken along the line XVIII—XVIII of FIG. 17.

FIG. 19 is a cross-sectional view taken along the line XIX—XIX of FIG. 17.

FIG. 24 is a cross-sectional view taken along the line XXIV—XXIV of FIG. 22.

And FIG. 25 is a perspective view showing an example of the driving mechanism 12 attached to the car body 2.

DESCRIPTION OF THE PREFERRED EMBODIMENTS

Figure 1:
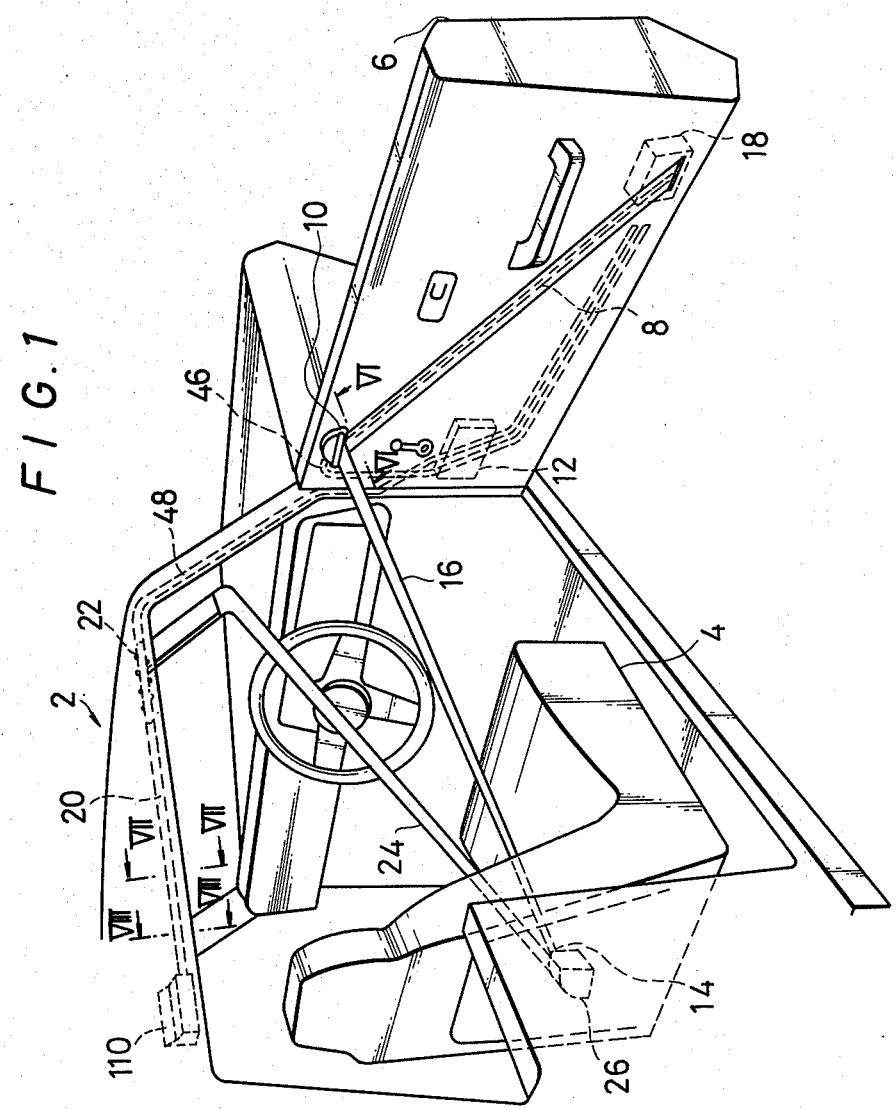
FIG. 1 is a perspective view showing an embodiment of this invention.
Figure 2:
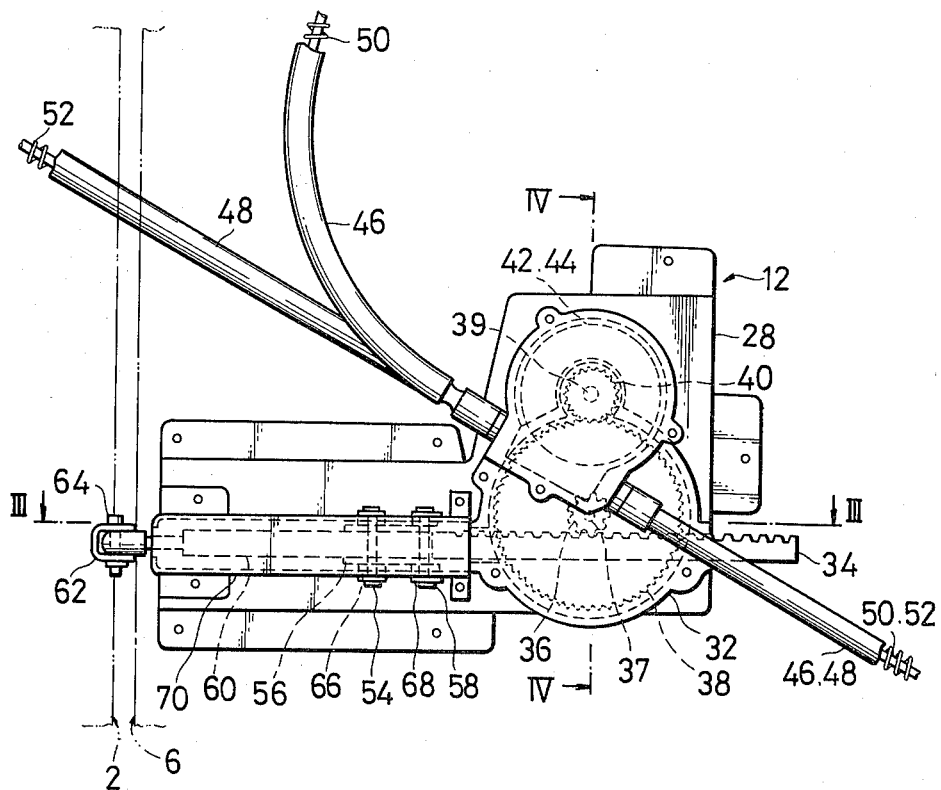
FIG. 2 is a front view showing an example of a driving mechanism 12 viewed from the car inside.
Figure 3:
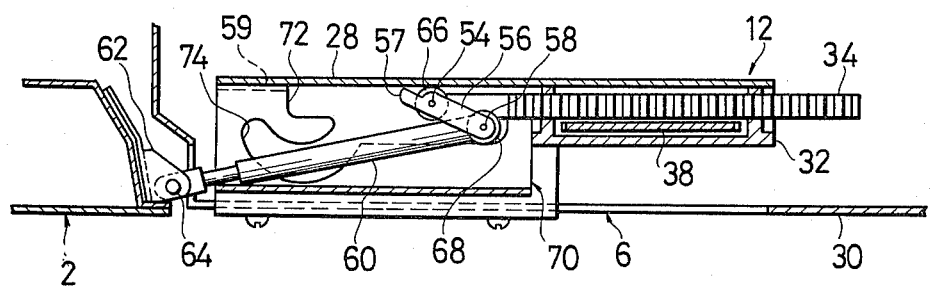
FIG. 3 is a cross-sectional view taken along the line III—III of FIG. 2.
Figure 4:
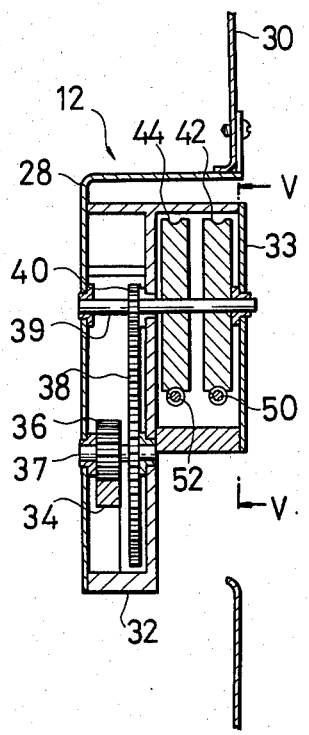
FIG. 4 is a cross-sectional view taken along the line IV—IV of FIG. 2.
Figure 5:
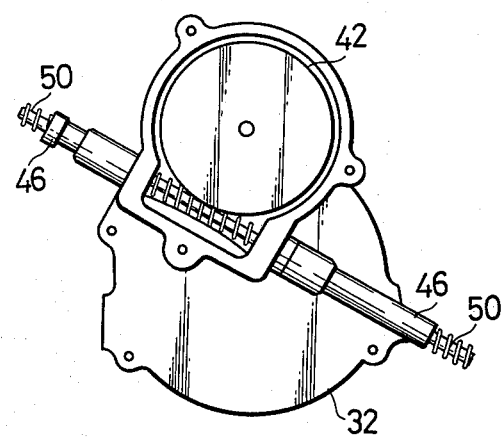
FIG. 5 is a cross-sectional view taken along the line V—V of FIG. 4, containing a casing 32, pulley 42, outer cable 46 and inner cable 50.

As shown in FIG. 1, a seat 4 is fixed to a body 2, to which the front-end of a door 6 is hinged. The door 6 carries a first guide 8 that extends from the lower rear end to the upper front end of the door 6. A run-through member 10 is slidably mounted on the guide 8. A driving mechanism 12 on the door 6 functions when it senses the opening and closing of the door 6. When the door 6 is opened, the driving mechanism 12 sends the run-through member 10 toward the upper end of the guide 8. When the door 6 is closed, the run-through member 10 is driven toward the lower end of the guide 8. A hip-belt anchor 14 is fastened to the center-side lower portion of the seat 4. While one end of a hip belt 16 is connected to the hip-belt anchor 14, the other end thereof is passed through the run-through member 10, then rolled up on a hip-belt retractor 18, with an emergency lock mechanism, fixed on the door 6. A second guide 20 is fastened to a roof rail extending along the edge of the roof above the seat 4, from rear to front of the body 2. A shoulder-belt anchor 22 slidably mounted on the second guide 20 is moved by the driving mechanism 12 toward the front end of the guide 20 when the door 6 is opened and toward the rear end of the guide 20 when the door 6 is closed. One end of the shoulder-belt 24 is connected to the shoulder-belt anchor 22, with the other end rolled up on a shoulder-belt retractor 26, with an emergency lock mechanism, fixed in the center-side lower portion of the seat 4.

With the above-described arrangement, when the door 6 is opened, the hip-belt 16 becomes stretched between the run-through member 10, which has been moved to the upper end of the first guide 8 by the driving mechanism 12, and the hip-belt anchor 14, and the shoulder-belt 24 becomes stretched between the shoulder-belt anchor 22, which has been moved to the front end of the second guide 20 by the driving mechanism 12, and the shoulder-belt retractor 26, whereby both hip belt 16 and shoulder belt 24 part from the seat to permit the driver or a passenger to get into and out of the car with ease. When the door 6 is open, the hip belt 16 and shoulder belt 24 stretch from the center-side of the seat 4 to the upper front end of the door 6 and the front end of the roof rail, respectively, coming closer to each other. Therefore, the driver or a passenger getting in the car can see where the hip belt 16 and shoulder belt 24 are at a glance, with a minimum of offensiveness to the sight. When he or she settles in the seat 4 and closes the door 6, the hip belt 16 becomes stretched between the run-through member 10, which has been moved by the driving mechanism 12 to the lower end of the first guide 8, and the hip-belt anchor 14, and the shoulder belt 24 between the shoulder-belt anchor 22, which has been moved by the driving mechanism 12 to the rear end of the second guide 20, and the shoulder-belt retractor 26. As a consequence, the hip belt 16 restrains the hip and the shoulder belt 24 restrains the upper body.

Referring now to FIGS. 2 through 5, an example of the driving mechanism 12 will be described.

A casing 32, having a cover 33, is fastened to a base plate 28 fixed on the inner panel 30 of the door 6. The casing 32 carries a rack 34 so as to be movable sideways in FIG. 3, a rotatable shaft 37 to which a pinion 36, adapted to engage with the rack 34, and a gear 38, having a larger diameter than the pinion 36, are fastened, and a rotatable shaft 39 to which a gear 40, adapted to engage with the gear 38 that is larger in diameter, and driving wheels 42 and 44, each having a larger diameter than the gear 40 and a peripheral groove, are fastened coaxially. Cables 50 and 52 are slidably run through tubes 46 and 48, respectively, connected to the casing 32. The cables 50 and 52 each comprise a fine-gauge wire helically wound around a core wire so as to engage with the grooves on the driving wheels 42 and 44 in the casing 32. The rack 34 is pivoted to a link 56 through a pin 54, the link 56 to a connecting rod 60 through a pin 58, and the connecting rod 60 to a bracket 62 fixed to the body 2 through a pin 64 offset from a pivot, not shown, on which the door 6 is hinged to the body 2. A roller 66 is mounted on the pin 54 and a roller 68 on the pin 58 so that the rollers 66 and 68 come in contact with guide surfaces formed on a guide member 70 bolted or otherwise fastened to the base plate 28. The guide member 70 has a first guide surface 72 with which the roller 66 comes in contact and a second guide surface 74 with which the roller 68 comes in contact. When the rod 60 is pulled a given distance away from the door 6, the roller 66 comes in contact with the left end of the first guide surface 72. When the rod 60 is pulled out further, the roller 68 slides along the arc of the second guide surface 74, so that the link 56 rotates about the pin 54. Accordingly, the rack 34 can be moved a desired distance by pulling out the rod 60 a given distance. In addition, even when the rod 60 is pulled out beyond the given distance, the rack 34 can remain in the desired position. The base plate 28 is perforated with an opening 59 in which a detent 57 on the link 56 fits when the link 56 rotates about the pin 54. When the door 6 is opened, therefore, the rod 60 is pulled out and the rack 34 is moved to the left in FIG. 3, thereby turning the driving wheels 42 and 44 through the pinion 36 and gears 38 and 40 and moving the cables 50 and 52.

The driving mechanism 12 may be attached to the car body to which the door 6 is hinged, as shown in FIG. 25. The driving mechanism 12 is not limited to the above-described type, but may come out in various designs, such as mechanical, hydraulic and electric, so far as it is adapted to function with the opening and closing of the door 6. For example, the pinion 36 may be connected to an electric motor that is interlinked with a switch that becomes activated and deactivated on sensing the opening and closing of the door 6.

Figure 6:
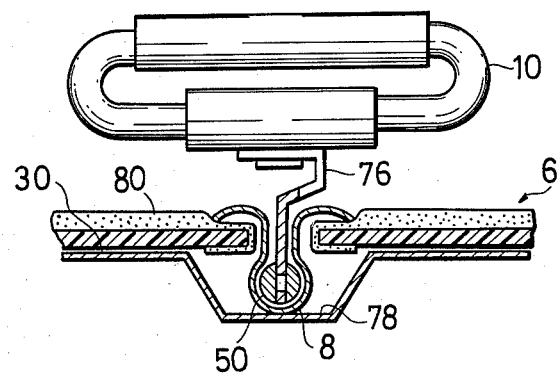
FIG. 6 is a cross-sectional view taken along the line VI—VI of FIG. 1.

Referring next to FIG. 6, an example of the first guide 8 attached to the door 6, together with the run-through member 10 slidably mounted on the guide 8, will be described.

The guide 8 comprises a tubular member that is connected to the tube 46 connected to the driving mechanism 12 and extends from the upper front to the lower rear of the door 6, with a longitudinal slit formed therein so as to open to the car interior. The run-through member 10 is attached to the cable 50 with a support 76 therebetween, and travels along the guide 8 as the cable 50 moves. The guide 8 is fixed in a recess 78 formed in the door inner panel 30. Both edges of the slit in the guide 8 extend outward and hold down a trim 80 lined on the surface of the door inner panel 30, as illustrated.

Figure 7:
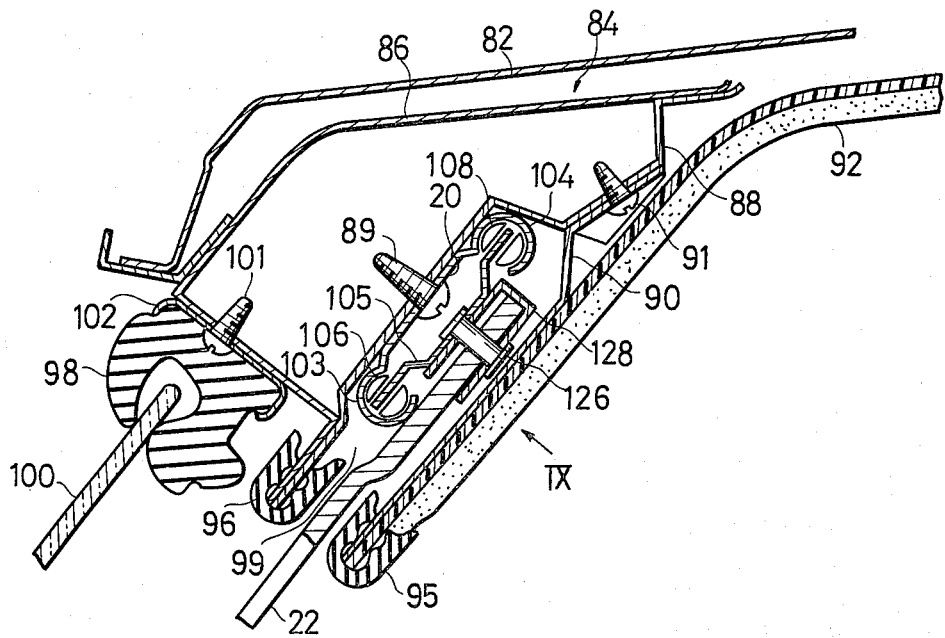
FIG. 7 is a cross-sectional view taken along the line VII—VII of FIG. 1, showing an example of a guide 20.
Figure 8:
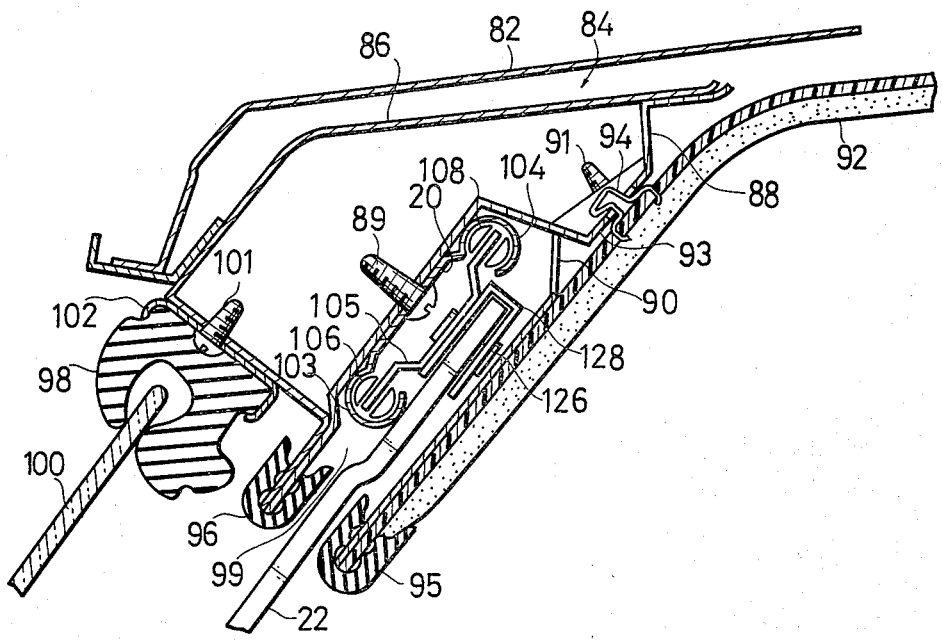
FIG. 8 is a cross-sectional view taken along the line VIII—VIII of FIG. 1.
Figure 9:
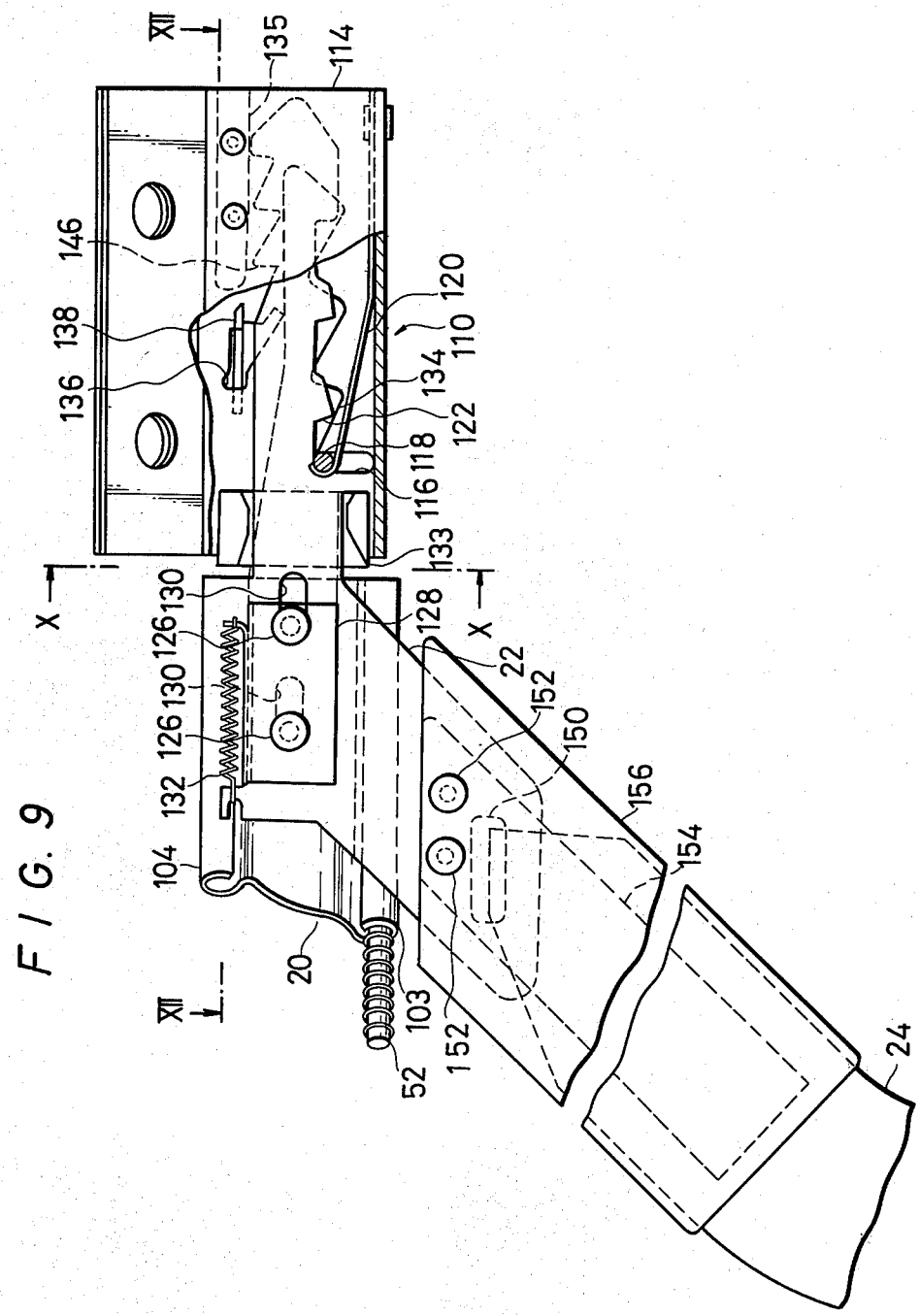
FIG. 9 shows those parts which are visible in the direction of the arrow IX in FIG. 7, except a ceiling lining 92, bracket 90 and other body components.
Figure 10:
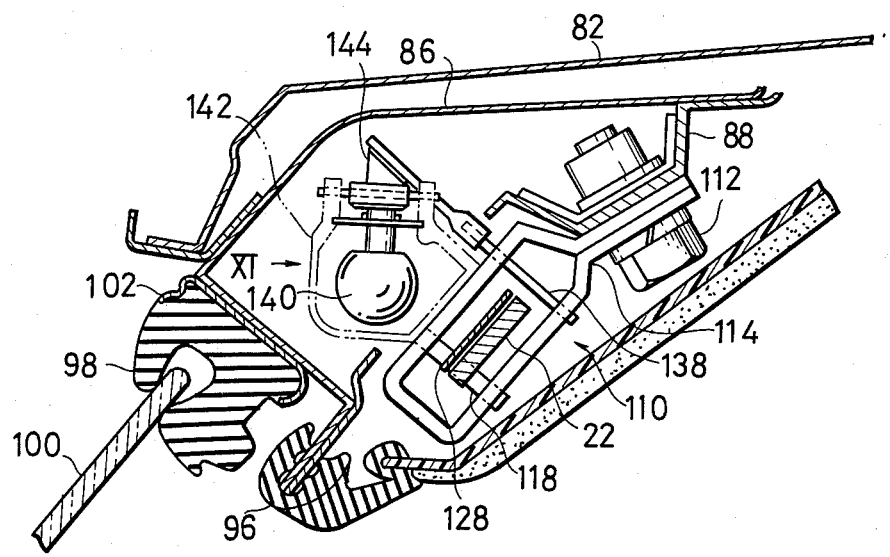
FIG. 10 is a cross-sectional view taken along the line X—X of FIG. 9.
Figure 11:
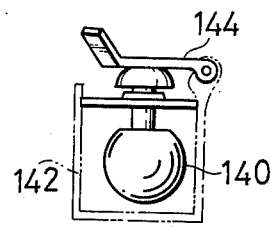
FIG. 11 shows a bracket 142, pendulum 140 and lifting plate 144 viewed in the direction of the arrow XI in FIG. 10.
Figure 12:
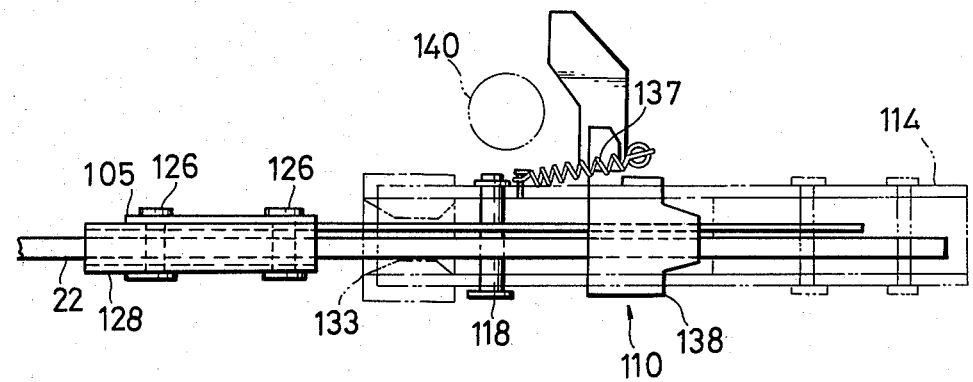
FIG. 12 is a cross-sectional view of a lock device 110 taken along the line XII—XII of FIG. 9.

Referring now to FIGS. 7 through 9, an example of the second guide 20 fastened to the side roof rail above the seat 4 and the shoulder-belt anchor 22 guided thereby will be described.

A roof rail 84, disposed at the edge of a roof panel 82, comprises an outer panel 86 and an inner panel 88. To the inner panel 88 is fastened the guide 20 for the anchor 22 with a screw 89, and a bracket 90 with a screw 91 so as to extend beyond the entire length of the guide 20, at a given distance from the inner panel 88. A ceiling lining 92 is fixed with a clip 94 to a projection 93, formed at suitable intervals on the inner panel 88, with the edge thereof fastened to the bracket 90 with an opening trim 95.

Thus, the guide 20 lies in a space 99 formed between the roof rail 84 and the ceiling lining 92, hidden from sight, both from inside and outside the car, to insure good appearance and kept out of easy touch that might result in a hand injury. To fasten the guide 20 and ceiling lining 92 to the roof rail 84, the guide 20 is first fastened to the inner panel 88 with the screw 89, then the ceiling lining 92 is fastened to the projection 93 on the inner panel 88 with the clip 94, with the edge thereof fastened to the bracket 90 with the opening trim 95. The guide 20 can be fastened to the inner panel 88 easily, and the ceiling lining 92 also can be fastened almost like the conventional ones.

Reference numeral 96 designates an opening trim covering the joint of the outer panel 86 and inner panel 88. Item 98 is a weather strip applied to a window glass 100, held by a support 102 fastened to the outer panel 34 with a screw 101.

The guide 20 has tubular parts 103 and 104 at both ends, which contain a roller 106 and 108, respectively, rotatably fitted to a support 105 supporting the anchor 22. The tubular parts 103 and 104 are provided with slits that permit the travel of the support 105. The support 105 is connected to the cable 52 moved by the driving mechanism 12 and inserted in the tubular part 103.

Behind the guide 20 is provided a locking device 110 that prevents the anchor 22, having reached the rear end of the guide 20, from moving forward. The following describes this locking device 110 by reference to FIGS. 9 through 12.

A lock pin 118 is fitted in a slot 116 provided in a frame 114, having a closed cross-section, fastened to the inner panel 88 of the roof rail 84 with a bolt 112. The lock pin 118 is at all times urged upward by a spring plate 120 fastened to the frame 114. The anchor 22 is provided with a tooth 122 adapted to engage with the lock pin 118 to prevent forward movement only. A slider 128 is fixed to the support 105 with pins 126. Passed through slots 130 made in the anchor 22, the pins 126 permit the anchor 22 to be moved over a given distance. A spring 132 is interposed between the slider 128 and anchor 22 so that the pin 126 contacts the front end of the slot 130. The slider 128 has a tooth 134 that disengages the lock pin 118 from the tooth 122 of the anchor 22 when the slider 128 moves forward. The spring 132 is designed to exert less urging force, through the tooth 134 of the slider 128, on the lock pin 118 than the spring plate 120. Reference numerals 133 and 135 denote guides fastened to the frame 114 to guide the anchor 22 and slider 128.

With this arrangement, closing the door 6 actuates the driving mechanism 12 to withdraw the slider 128 and anchor 22 through the cable 52, as shown in FIG. 9. On this occasion, the lock pin 118 does not prevent the anchor 22 from withdrawing. When the shoulder belt 24 is pulled forward in the state of FIG. 9, the anchor 22 alone becomes ready to move forward, leaving the slider 128 behind. But the anchor 22 is prevented from advancing, with the tooth 122 coming in contact with the lock pin 118. When the opening door 6 actuates the driving mechanism 12 to pull the slider 128 forward through the cable 52, the slider 128 and anchor 22 move forward integrally, with the pin 126 contacting the front end of the slot 130 in the anchor 22. At this time, the tooth 134 on the slider 128 lowers the lock pin 118 out of engagement with the tooth 122 on the anchor 22. Consequently, the anchor 22 is now free to move forward.

In this embodiment, a pawl 138, normally held in the illustrated position by a spring 137, is placed in an opening 136 provided in the frame 114 so as to be rotatable through a given angle only. A bracket 142, swingably supporting a pendulum 140, is fixed to the side of the frame 114. A lifting plate 144, contacting the upper end of the pendulum 140, is pivotally attached to the bracket 142. The pawl 138 is turned when the pendulum 140 tilts to raise the lifting plate 144. The anchor 22 has a tooth 146 that engages with the turned pawl 138 to prevent forward movement.

Therefore, when the shoulder belt 24 is pulled forward by, for example, the stooping driver suffering from a collision, excessive tilting or other trouble of the car, and the anchor 22 becomes ready to move forward, the tooth 122 is stopped by the engaging lock pin 118. Further, the pendulum 140 tilts to rotate the pawl 138 through the lifting plate 144, whereby the pawl 138 stops the tooth 146.

The reason why the pawl 138, actuated by the pendulum 140, is added to the lock pin 118 to complete the locking system for the anchor 22 is as follows: If the anchor 22 is locked only by the engagement of the lock pin 118 with the tooth 122, there is a probability of the lock pin 118 disengaging from the tooth 122, depressed by the slider 128 that is pulled forward by the cable 52 when the car body deforms as a result of collision etc. Further, the engagement of the pawl 138 with the tooth 146 permits a collision-induced load imposed on the anchor 22 through the shoulder belt 24 to be divided between the lock pin 118 and pawl 138. As will be understood, the pawl 138 and pendulum 140 actuated thereby can be dispensed with, if design is made so that, in case of collision etc., the cable 52 does not pull forward the slider 128, or the lock pin 118 is strong enough to bear by itself the load exerted on the anchor 22. The teeth 122 and 146 on the anchor 22 and the tooth 134 on the slider 128 each are provided in plurality. If the tube 48 connected to the driving mechanism 12 elongates somewhat after long use, the anchor 22 might withdraw a shorter distance than it should when the door 6 is closed. Even then, the lock pin 118 and pawl 138 will surely prevent the forward movement of the anchor 22 because of the plurality of the teeth.

The shoulder belt 24 is connected to the anchor 22, with one end thereof passed and turned back through an opening 150 provided in the anchor 22 and the overlapped part sewn together. To this connecting part of the anchor 22 is fastened a spring plate 154 with rivets 152 so as to extend along the inside of the shoulder belt 24. The spring plate 154 permits keeping the shoulder belt 24 out of contact with the driver's or passenger's neck, displacing the projection of the shoulder belt 24 near the anchor 22 outward. When the anchor 22 has moved to the front end of the guide 20 on opening the door 6, the spring plate 154 brings the shoulder belt 24 close to the hip belt 16, thus facilitating the ascertaining of the position of the shoulder belt 24 and hip belt 16 at a glance. Reference numeral 156 designates a cover of synthetic resin that covers the anchor 22 and spring plate 154.

Figure 13:
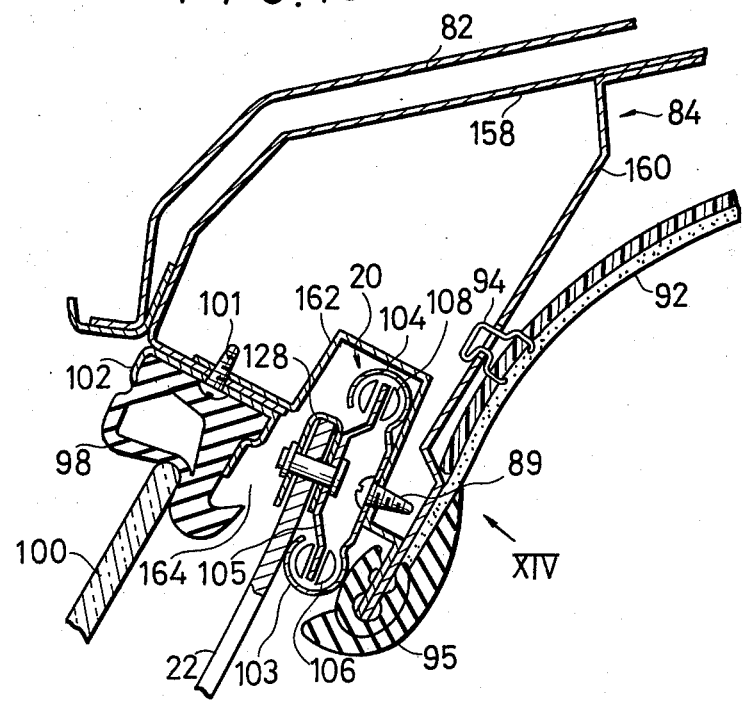
FIG. 13 is a cross-sectional view similar to FIG. 7, but showing another example of the guide 20.
Figure 14:
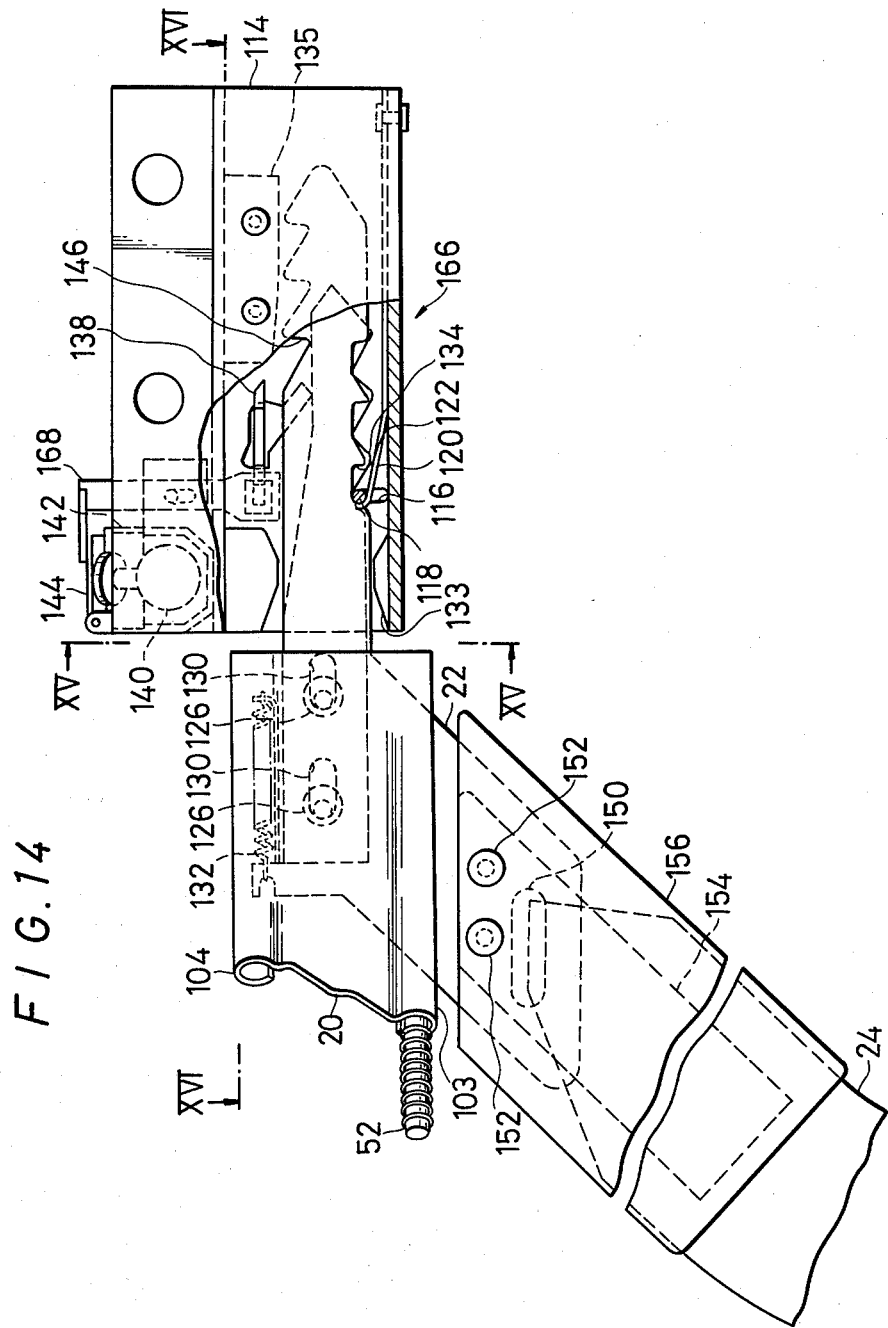
FIG. 14 shows those parts which are visible in the direction of the arrow XIV in FIG. 13, except the ceiling lining 92, an inner panel 160, connecting panel 162 and other body components.

Referring now to FIGS. 13 and 14, another example of the second guide 20 and shoulder-belt anchor 22 each will be described. In these figures, similar reference numerals, used in FIGS. 7 through 12, designate similar parts.

The roof rail 84 comprises an outer panel 158, an inner panel 160, and a channel-like connecting panel 162 with the opening thereof facing downward. The guide 20 is fastened to the connecting panel 162 with a screw 89 so as to lie in a space formed by the roof rail 84 and weather strip 98. The ceiling lining 92 is fixed to the inner panel 160 of the roof rail 84 with the clip 94, with the edge thereof fastened to the roof rail 84 with the opening trim 95. Thus resting in the space 164 between the roof rail 84 and weather strip 98, the guide 20 is hidden from sight, both from inside and outside the car, to insure good appearance and kept out of easy touch that might result in a hand injury. To fasten the guide 20 and ceiling lining 92 to the roof rail 84, the guide 20 is first fastened from outside the car to the connecting panel 162 with the screw 89, the support 102 to the outer panel 158 with the screw 101, then the weather strip 98 to the support 102. Thus the guide 20 can be fastened to the roof rail 84 easily. The ceiling lining 92 also can be fastened almost like the conventional ones.

Other parts too are composed and function like those shown in FIGS. 7 through 9.

Figure 15:
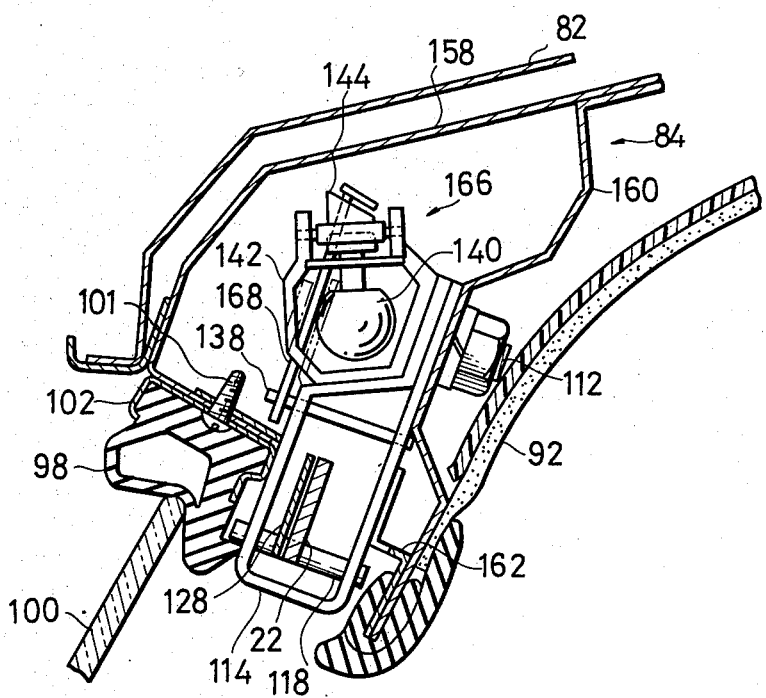
FIG. 15 is a cross-sectional view taken along the line XV—XV of FIG. 14.
Figure 16:
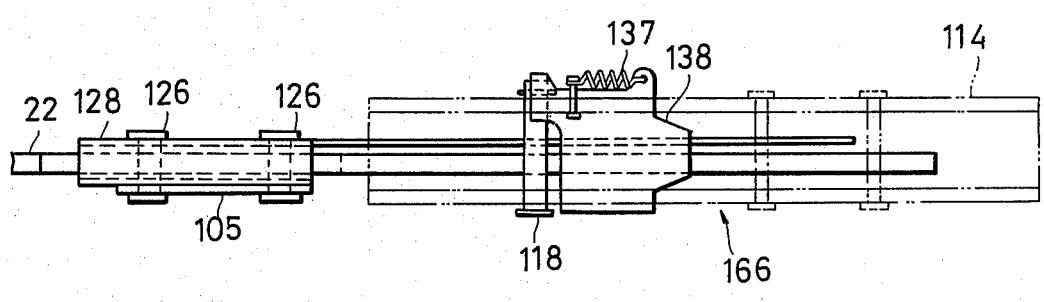
FIG. 16 is a cross-sectional view of a lock device 110 taken along the line XVI—XVI of FIG. 14.
Figure 17:
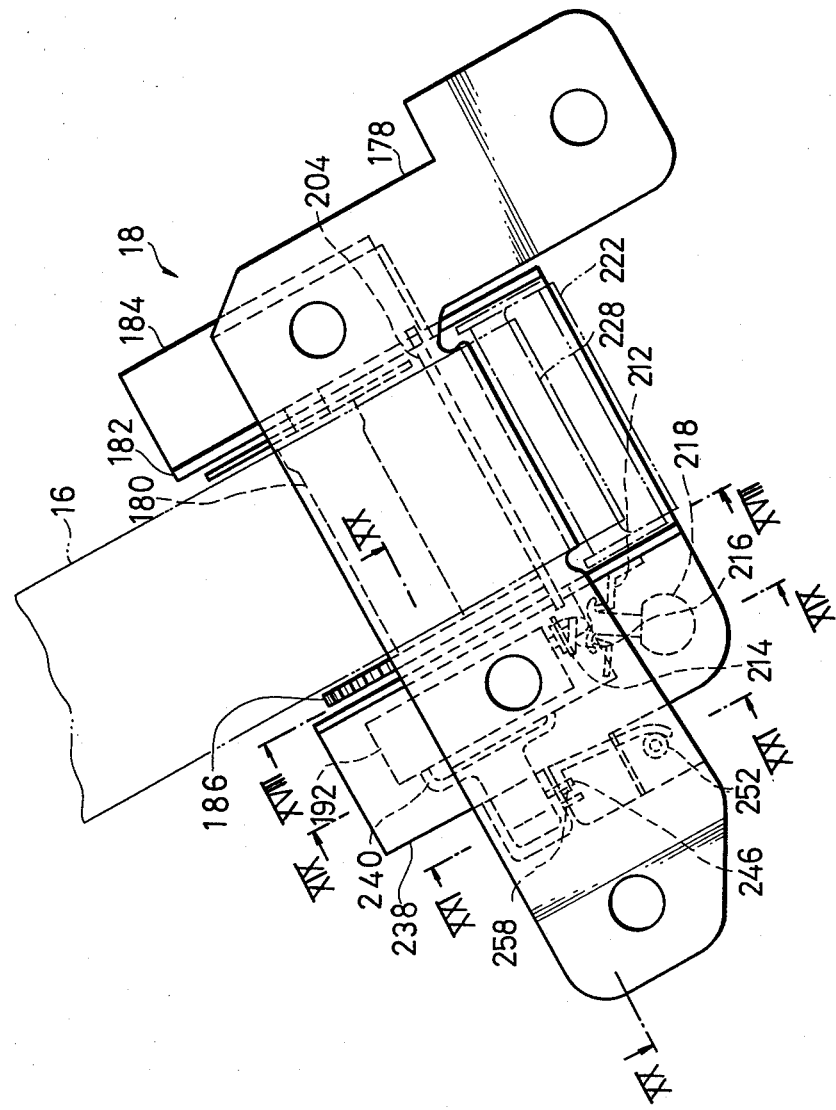
FIG. 17 is a front view showing an example of a hip belt retractor 18 viewed from the car inside.
Figure 20:
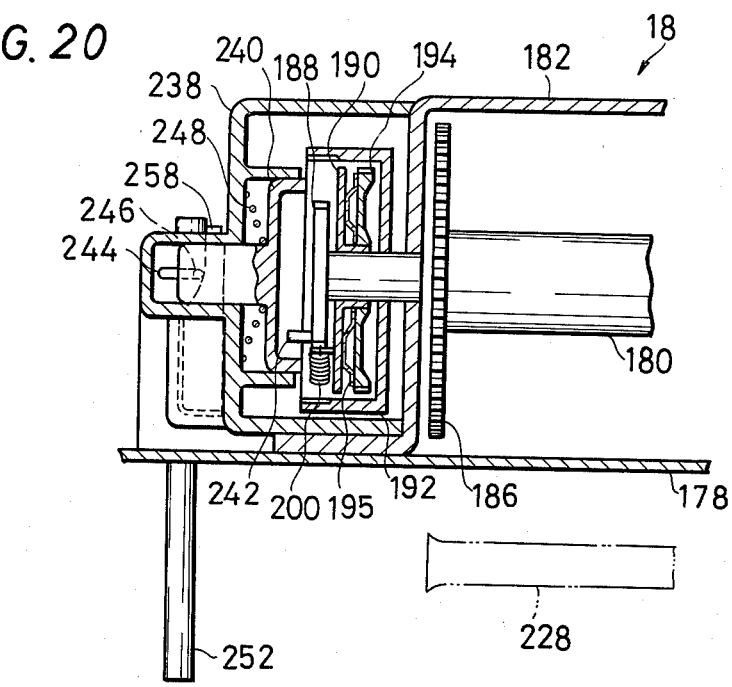
FIG. 20 is a cross-sectional view taken along the line XX—XX of FIG. 17.
Figure 21:
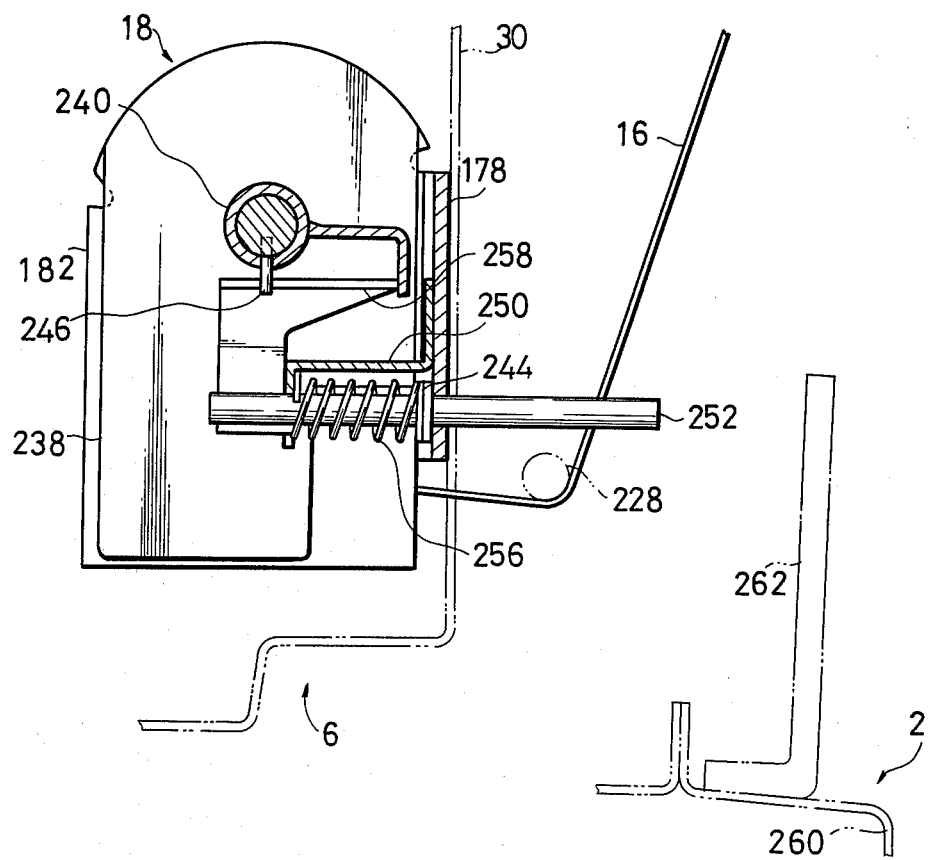
FIG. 21 is a cross-sectional view taken along the line XXI—XXI of FIG. 17.

Behind this second guide 20 too is provided a locking device 166 that prevents the anchor 22, having reached the rear end of the guide 20, from moving forward. The locking device 166 will be described by reference to FIGS. 14 through 16.

This locking device 166 differs from the locking device 110 shown in FIGS. 9 through 12 only in that the bracket 142, which swingably supports the pendulum 140, carries not only the lifting plate 144 but also a lifting arm 168 interlocking the lifting plate 144 with the pawl 138, and that the frame 114 is provided on the outer side of the inner panel 160 of the roof rail 84. Other parts are composed and function like those of the locking device 110 shown in FIGS. 9 through 12.

As with the locking device 110, closing the door 6 puts this locking device 166 in a state shown in FIG. 14, actuating the driving mechanism 12 to withdraw the slider 128 and anchor 22 through the cable 52. On this occasion, the lock pin 118 does not prevent the anchor 22 from withdrawing. When the shoulder belt 24 is pulled forward in the state of FIG. 14, the anchor 22 alone becomes ready to move forward, leaving the slider 128 behind. But the anchor 22 is prevented from advancing, with the tooth 122 coming in contact with the lock pin 118. When the opening door 6 actuates the driving mechanism 12 to pull the slider 128 forward through the cable 52, the slider 128 and anchor 22 move forward integrally, with the pin 126 contacting the front end of the slot 130 in the anchor 22. At this time, the tooth 134 on the slider 128 lowers the lock pin 118 out of engagement with the tooth 122 on the anchor 22. Consequently, the anchor 22 is now free to move forward.

Therefore, when the shoulder belt 24 is pulled forward as a result of collision, excessive tilting or other trouble of the car, and the anchor 22 becomes ready to move forward, the tooth 122 of this locking device 166 too is stopped by the engaging lock pin 118. Further, the pendulum 140 tilts to rotate the pawl 138 through the lifting plate 144 and lifting arm 168, whereby the pawl 138 stops the tooth 146.

Referring next to FIGS. 17 through 21, an example of the retractor 18 that is fastened to the door 6 to take up the hip belt 16.

To a base plate 178 fixed on the door inner panel 30 is fastened, with a rivet, a channel-shaped frame 182 that rotatably supports a belt take-up shaft 180. The belt take-up shaft 180 is at all times urged by a spring not shown, contained in a spring housing 184 on the frame 182, in a direction to take up the hip belt 16. The belt take-up shaft 180 supports a ratchet wheel 186 and a cam wheel 188, both fixed, and a flywheel 190 and an internally toothed clutch wheel 192, both rotatable. A ratchet wheel 194 is rotatably mounted on the cylindrical portion of the flywheel 190. A compressed disk spring 195 is interposed between the flywheel 190 and ratchet wheel 194, thus providing frictional force to the relative rotation thereof. A hook 196, adapted to engage with the cam wheel 188, is mounted for pivoting on the flywheel 190 with a pin 198. A spring 200 provided between the hook 196 and a pin 199 on the flywheel 190 at all times urges the hook 196 in contact with the cam wheel 188, and out of engagement with the clutch wheel 192. In a fan-shaped opening 202 formed in the frame 182 is fitted a pawl 204, adapted to engage with the ratchet wheel 186, so as to be rotatable through a given angle only. The pawl 204 is urged out of engagement with the ratchet wheel 186 by a spring 206 whose one end is fixed to the frame 182. An arm 208 is fastened to one end of the pawl 204. An engaging part 210, adapted to engage with the arm 208, is formed on the clutch wheel 192. Accordingly, the pawl 204 rotates as the clutch wheel 192 rotates. A stopper 214, adapted to engage with the ratchet wheel 194, is mounted to pivot, with a pin 216, to a bracket 212 fastened on the frame 182. The bracket 212 swingably supports a pendulum 218. When the pendulum 218 tilts, the upper end thereof pushes up the stopper 214. A shaft 224 is attached to the outermost end of an arm 222 pivoted with a shaft 220 to the frame 182. Cylindrical rollers 226 and 228, both contacting the hip belt 16, are loosely fitted over the shafts 220 and 224, respectively. The arm 222 is at all times urged downward by a spring 230. A clamp member 232, having projections, is attached to the arm 222. A clamp member 236, having projections, is attached to a flange 234 formed on the base plate 178 so as to lie opposite to the clamp member 232.

With this arrangement, when the hip belt 16 is pulled out at ordinary service speed, the cam wheel 188 stops the hook 196, because the hook 196 is pressed against the cam wheel 188 by the spring 200. The flywheel 190 and hook 196 rotate about the take-up shaft 180 at the same speed as the cam wheel 188 fastened to the take-up shaft 180. Therefore, the hook 196 does not engage with the clutch wheel 192. Consequently, the pawl 204 is kept out of engagement with the ratchet wheel 186 by the spring 206, and the hip belt 16 is pulled out smoothly. The spring 230 urging the arm 222 downward has such force that the arm 222 does not turn upward when the belt is pulled out during ordinary driving.

When the hip belt is jerked out, the cam wheel 188 rotates ahead of the flywheel 190 to push the hook 196 outward against the urging force of the spring 200, because of the inertia of the flywheel 190 and hook 196 that are rotatable with respect to the take-up shaft 180. Coming in engagement, the hook 196 rotates the clutch wheel 192, which, in turn, rotates the pawl 204, through the engaging part 210 and arm 208, into engagement with the ratchet wheel 186, thus locking the take-up shaft 180. In case of collision, excessive tilting or other car troubles, the pendulum 218 tilts to raise the stopper 214 into engagement with the ratchet wheel 194. If the hip belt 16 is pulled in this state, the cam wheel 188 rotates with the take-up shaft 180. But the cam wheel 188 pushes the hook 196 outward against the urging force of the spring 200, because the flywheel 190 is kept in frictional engagement with the ratchet wheel 194 by the disk spring 195. Again, as in the above-described case, the hook 196 engages with and rotates the clutch wheel 192, which, in turn, rotates the pawl 204, through the engaging part 210 and arm 208, into engagement with the ratchet wheel 186, thus locking the take-up shaft 180. Accordingly, the retractor 18 securely locks the belt take-up shaft 180 whenever the hip belt 16 is jerked out, or the car body is subjected to acceleration or tilt exceeding a given limit. When the take-up shaft 180 in this retractor 18 is locked, the shaft 224 of the arm 222 is vigorously pulled upward by the pulling force of the hip belt 16. The arm 222 rotates upward, so that the clamp members 232 and 236 clamp the hip belt 16, which is thus prevented from being pulled out. After the take-up shaft 180 has been locked, therefore, pullout of the hip belt 16 therefrom is substantially perfectly prevented.

In this retractor 18, a cap 240, having a cylindrical portion, is slidably attached to a housing 238 fixed to the frame 182. A pin 242 is secured to the hook 196. When the hook 196 is ready to move outward, the pin 242 on the hook 196 comes in contact with the internal surface of the cap 240, thereby keeping the hook 196 out of engagement with the clutch wheel 192. The cap 240 carries a pin 246 passed through a slot 244 in the housing 238, and a compressed spring 248 connected to the housing 238. A rod 252 is slidably attached to the base plate 178 and a bracket 250 fastened thereto. A spring 256 is interposed under compression between a flange 254 formed on the rod 252 and the bracket 250. When the rod 252 slides, a cam 258 fastened thereto engages with the pin 246 to slide the cap 240. A contact member 262, adapted to contact and withdraw the the rod 252 when the door 6 is closed, is fastened to a side sill 260 on the side of the car body 2. When the door 6 is closed, therefore, the rod 252 contacts the contact member 262 and moves to the left in FIG. 21. Then, the cam 258 moves the cap 240, through the pin 246, into a position where outward displacement of the hook 196 is not prevented thereby. Therefore, when the hip belt 16 is jerked out or the car body is subjected to sudden acceleration, the pawl 204 locks the belt take-up shaft 180 as described before. When the door 6 is not closed, the spring 256 moves the rod 252 away from the contact member 262 to the right in FIG. 21. The spring 248 moves the cap 240 into a position where outward displacement of the hook 196 is prevented thereby. Therefore, even if the hip belt 16 is jerked out or the car body is subjected to sudden acceleration, the hook 196 cannot move outward, and the belt take-up shaft 180 is not locked by the pawl 204. Accordingly, even if the door 6 is vigorously opened to jerk out the hip belt 16 or tilt the pendulum 218, the belt take-up shaft 180 remains unlocked. If the hip belt 16 were locked, the vigorously opened door 6 would not be able to continue opening further. This inconvenience is successfully eliminated.

Figure 22:
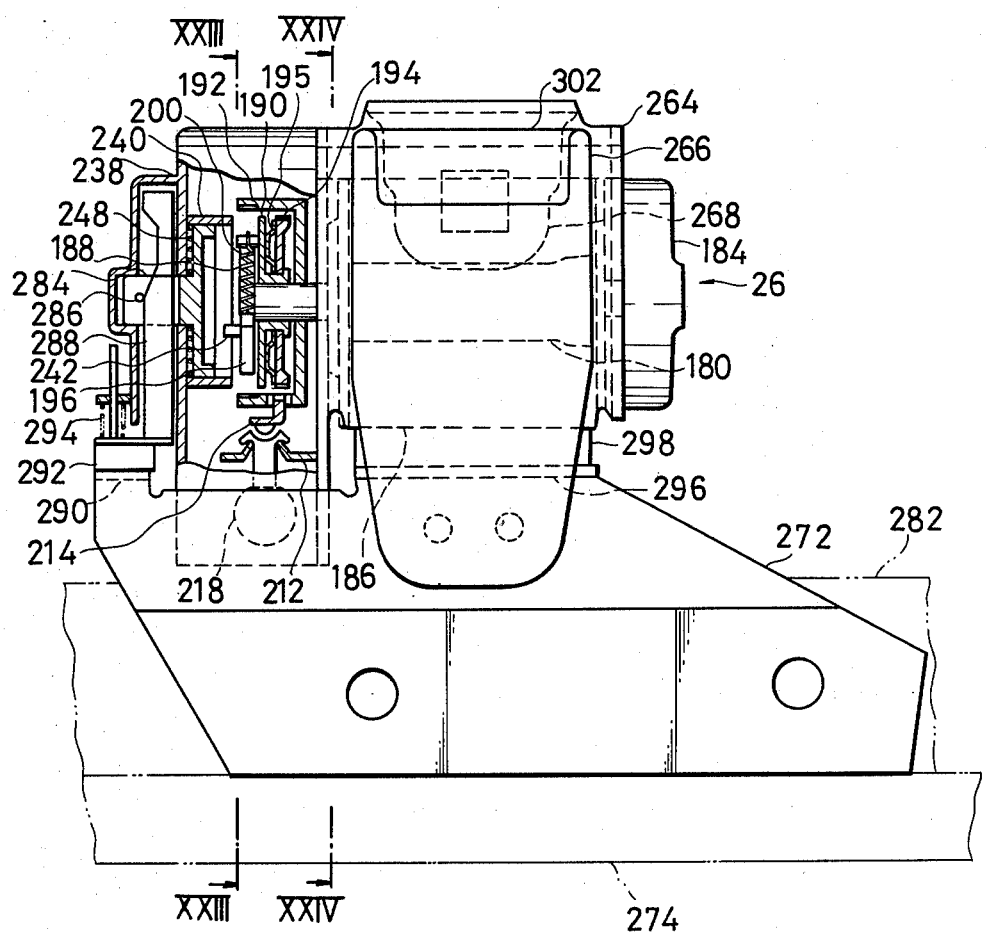
FIG. 22 is a front view showing an example of a shoulder belt retractor 26 viewed from a left-side seat not shown.
Figure 23:
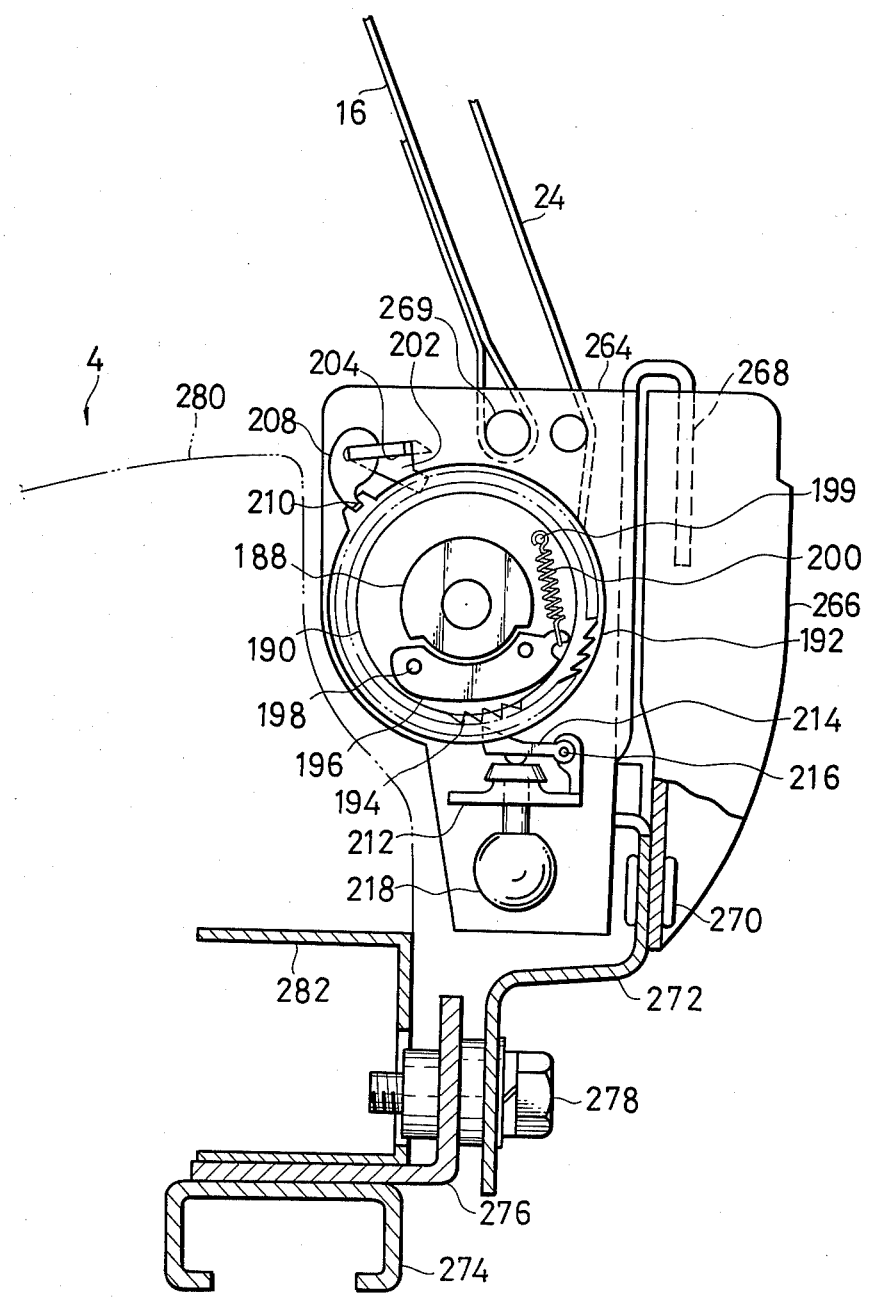
FIG. 23 is a cross-sectional view taken along the line XXIII—XXIII of FIG. 22.

Referring now to FIGS. 22 through 24, an example of the shoulder-belt retractor 26 and hip-belt anchor 14 will be described. Such parts as are similar to those in the retractor 18 are designated by similar reference numerals.

A tongue 268, adapted to detachably engage with a buckle 266, is formed on a channel-shaped frame 264 that rotatably supports a belt take-up shaft 180. A hip-belt anchor 269, comprising a rod connected to the hip belt 16, is fastened to the frame 264. The belt take-up shaft 180 is at all times urged by a spring, not shown, contained in a spring housing 184 on the frame 264, so as to take up the shoulder belt 24. The belt take-up shaft 180 carries a ratchet wheel 186 and cam wheel 188, both fixed, and a flywheel 190 and internally toothed clutch wheel 192, both rotatable. A ratchet wheel 194 is rotatably attached to the cylindrical portion of the flywheel 190. A disk spring 195 is compressedly interposed between the flywheel 190 and ratchet wheel 194. A hook 196 is mounted to pivot on to the flywheel 190 with a pin 198. A spring 200 is provided between the hook 196 and a pin 199 secured to the flywheel 190. A pawl 204 fits in an opening 202 formed in the frame 264. The pawl 204 is at all times urged by a spring 206 out of engagement with the ratchet wheel 186. An arm 208, adapted to engage with an engaging part 210 formed on the clutch wheel 192, is fastened to the pawl 204. Therefore, the pawl 204 rotates with the clutch wheel 192. A stopper 214 is pivoted, with a pin 216, to a bracket 212 fixed to the frame 264. The bracket 212 swingably supports a pendulum 218.

With this arrangement, the belt take-up shaft 180 is locked, as in the case of the hip-belt retractor 18, when the shoulder belt 24 is jerked out or the car body 2 is subjected to sudden acceleration.

The buckle 266 is fastened to a bracket 272 with a rivet 270. The bracket 272 is fastened, with a bolt 278, to a bracket 276 fastened to an adjuster upper rail 274 of the seat 4. The bracket 272 may be fastened to a cushion frame 282 supporting a cushion 280 of the seat 4 or to the body floor.

In this retractor 26 too, a housing 238 fastened to the frame 264 slidably carries a cap 240. When the hook 196 is ready to move outward, a pin 242 secured to the hook 196 comes in contact with the internal surface of the cap 240, so that the hook 196 is kept out of engagement with the clutch wheel 192. A groove 284 is formed in the rear end of the cap 240, and a pin 286 is secured in such a manner as to cross the groove 284. A vertically slidable cam 288 is attached to the housing 238. When the tongue 268 of the retractor 26 engages with the buckle 266, the lower end of the cam 288 comes in contact with an elastic member 292 of rubber etc. fastened to a flange 290 on the bracket 272. Then, the cam 288 rises to withdraw the cap 240, through the pin 286, against the urging force of a spring 248, as shown in FIG. 22. The cap 240 then does not prevent the outward displacement of the hook 196. When the tongue 268 disengages from the buckle 266, the cam 288 descends, urged by a spring 294. The spring 248 brings the cap 240 into a position where the outward displacement of the hook 196 is prevented thereby. Even if the shoulder belt 24 is jerked out or the pendulum 218 tilts when the retractor 26 is about to be engaged with the buckle 266, the above-described arrangement keeps the belt take-up shaft 16 unlocked and the engagement of the retractor 26 with the buckle 266 unimpeded. The buckle 266 permits removing the shoulder belt 24 and hip belt 16 from the driver or passenger when collision or other accident calls for rescuing him or her out of the seat 4.

Unlike the hip-belt retractor 18, this shoulder-belt retractor 26 is devoid of a mechanism to prevent the pull-out of the belt due to tightening, comprising clamp members 232 and 236. This is because the shoulder belt 24 is displaced only to a minor extent between the shoulder-belt anchor 22 and retractor 26 when the anchor 22 moves along the guide 20. This permits reducing the length of the shoulder belt 24 to be taken up by the retractor 26 when the shoulder belt 24 is restraining the driver or passenger. Therefore, the length of the shoulder belt 24 pulled out as a result of tightening due to the locking of the belt take-up shaft 16 is very limited.

An elastic member 298 of rubber etc. is fastened to a flange 296 on the bracket 272. The elastic member 298 is adapted to be compressed by a flange 300 on the frame 264 when the tongue 268 of the retractor 26 engages with the buckle 266. This prevents loose fitting between the frame 264 of the retractor 26 and the buckle 266, and raises the retractor 26 when an engaging piece, not shown, is disengaged from the tongue 268 by pushing an operation button 302 on the buckle 266.

The retractors 18 and 26 are not limited to the above-described embodiments, but may be designed so as to lock the belt take-up shaft sensing the acceleration of the car body only, or the jerk-out of the belt only, or otherwise.

What is claimed is:

1. A seat-belt system comprising a first guide provided on a door, the door being on one side of a car seat and the front end thereof being hinged to a car body, so as to extend from the lower rear to the upper front of the door, run-through means having an opening for permitting a belt to pass therethrough and guided by the first guide, a hip-belt anchor fastened to either of the seat and car body so as to rest near the car center side of the seat, a hip-belt retractor fastened to the lower rear of the door, a hip belt with one end thereof connected to the hip-belt anchor and the other end passed through the run-through means and wound around the hip-belt retractor fastened to the lower rear of the door, a second guide attached to a car roof rail on one roof side above the seat so as to extend along the longitudinal axis of the car body, a shoulder-belt anchor guided by the second guide, a shoulder-belt retractor fastened to either of the seat and car body so as to rest near the car center side of the seat, releasing means interposed between the shoulder-belt retractor and either of the seat and car body for releasing the shoulder-belt retractor therefrom, a shoulder belt with one end thereof connected to the shoulder-belt anchor and the other end wound around the shoulder-belt retractor, and driving means responsive to the opening and closing of the door for moving the run-through means to the upper end of the first guide and the shoulder-belt anchor to the front end of the second guide when the door opens, and for moving the run-through means to the lower end of the first guide and the shoulder-belt anchor to the rear end of the second guide when the door closes.

2. A seat-belt system according to claim 1, in which means for projecting the shoulder belt downward is provided to the shoulder-belt anchor.

3. A seat-belt system according to claim 2, in which the projecting means is made of elastic material.

4. A seat-belt system according to claim 3, in which the projecting means and that part of the shoulder belt which corresponds thereto are covered with a cover of synthetic resin.

5. A seat-belt system according to claim 1, in which the releasing means comprises a tongue and a buckle adapted to detachably engage therewith, one of the tongue and buckle being provided on a casing of the shoulder-belt retractor and the other on either of the seat and car body.

6. A seat-belt system according to claim 5, in which the tongue is formed integrally with the casing of the shoulder-belt retractor made of plate and the buckle is fastened to either of the seat and car body.

7. A seat-belt system according to claim 6, in which the tongue is formed by bending the upper end of said casing downward.

8. A seat-belt system according to claim 1, in which elastic means is interposed between the shoulder-belt retractor and either of the seat and car body for being compressed when the tongue engages with the buckle.

9. A seat-belt system according to claim 5, in which the hip-belt anchor is provided on the shoulder-belt retractor casing.

10. A seat-belt system according to claim 9, in which the shoulder-belt retractor casing has two walls facing opposite to each other and supporting both ends of a shoulder-belt take-up shaft, and the hip-belt anchor comprises a shaft held between the two walls.

11. A seat-belt system according to claim 1, in which the shoulder-belt retractor has locking means to stop the rotation of the belt take-up shaft in case of emergency and holding means to keep the locking means inoperative when the releasing means has released the shoulder-belt retractor from either of the seat and car body.

12. A seat-belt system according to claim 11, in which the holding means comprises a holding member attached to the shoulder-belt retractor casing so as to be movable between a holding position where the holding means impedes the operation of the locking means and a non-holding position where the holding means remains ineffective to impede the operation of the locking means, an elastic member constantly urging the holding member into the holding position, and a contacting member adapted to move the holding member to the non-holding position against the urging force of the elastic member, coming in contact with a contacting part formed on either of the seat and car body, when the shoulder-belt retractor has been fastened to either of the seat and car body.

13. A seat-belt system according to claim 12, in which the holding and contacting members are integrally formed.

14. A seat-belt system according to claim 12, in which the locking means comprises a sensor for detecting an emergency in the car body, a locking member adapted to engage with the shoulder-belt take-up shaft to stop the rotation thereof, and an operating member to operate the locking member according to the response of the sensor, and the holding member holds, assisted by the urging force of the elastic member, the operating member in the holding position so as not to operate the locking member.

15. A seat-belt system according to claim 14, in which the operating member comprises an engaging pawl which is attached to the shoulder-belt take-up shaft so as to be rotatable therewith and adapted to be displaced outward with respect to the axis of the take-up shaft when the sensor has detected the emergency and an annular member which is rotatably attached to said casing, furnished with internal teeth adapted to engage with the displaced engaging pawl and operate the locking member when rotated, and the holding member has a cylindrical part that is disposed coaxially with the shaft axis and movable between a holding position where the internal surface thereof comes in contact with the engaging pawl to prevent the outward displacement thereof and a non-holding position away from the holding position along the shaft axis where the outward displacement is not prevented, and is constantly urged in the holding position by the elastic member.

16. A seat-belt system according to claim 12, in which the contacting member has an inclined surface that moves the holding member into the non-holding position, against the urging force of the elastic member, slidingly coming in contact with the holding member when the contacting member moves in contact with the contacting part on either of the seat and car body.

17. A seat-belt system according to claim 12, in which the releasing means is supported by a bracket fastened to either of the seat and car body so as to come in contact therewith when the retractor is fitted in the bracket.

18. A seat-belt system according to claim 1, in which the hip-belt retractor comprises locking means to stop the rotation of the belt take-up shaft in case of emergency and holding means to keep the locking means inoperative when the door is not closed.

19. A seat-belt system according to claim 18, in which the holding means comprises a holding member attached to the shoulder-belt retractor casing so as to be movable between a holding position where the holding means impedes the operation of the locking means and a non-holding position where the holding means is ineffective to impede the operation of the locking means, an elastic member constantly urging the holding member into the holding position, and a contacting member adapted to move the holding member to the non-holding position against the urging force of the elastic member, coming in contact with a contacting part formed on the car body, when the door is closed.

20. A seat-belt system according to claim 19, in which the holding and contacting members are integrally formed.

21. A seat-belt system according to claim 19, in which the locking means comprises a sensor detecting an emergency in the car body, a locking member adapted to engage with the shoulder-belt take-up shaft to stop the rotation thereof, and an operating member to operate the locking member according to the response of the sensor, and the holding member holds, assisted by the urging force of the elastic member, the operating member in the holding position so as not to operate the locking member.

22. A seat-belt system according to claim 21, in which the operating member comprises an engaging pawl which is attached to the shoulder-belt take-up shaft so as to be rotatable therewith and adapted to be displaced outward with respect to the axis of the take-up shaft when the sensor has detected the emergency and an annular member which is rotatably attached to said casing, furnished with internal teeth adapted to engage with the displaced engaging pawl and operate the locking member when rotated, and the holding member has a cylindrical part that is disposed coaxially with the shaft axis and movable between a holding position where the internal surface thereof comes in contact with the engaging pawl to prevent the outward displacement thereof and a non-holding position away from the holding position along the shaft axis where the outward displacement is not prevented, and is constantly urged in the holding position by the elastic member.

23. A seat-belt system according to claim 19, in which the contacting member has an inclined surface that moves the holding member into the non-holding position, against the urging force of the elastic member, slidingly coming in contact with the holding member when the contacting member moves in contact with the contacting part on the car body.

24. A seat-belt system according to claim 18, in which the hip-belt retractor comprises a pressing member which normally is spring-urged to contact and bend the hip belt and is moved by the hip belt when the hip belt is pulled while the rotation of the belt take-up shaft is prevented by the locking means, and a stopper member adapted to stop the hip belt as the pressing member moves.

25. A seat-belt system according to claim 24, in which the pressing and stopper members are integrally formed.

26. A seat-belt system according to claim 24, in which the pressing member comprises a shaft member supported by an arm rotatably attached to the retractor casing.

27. A seat-belt system according to claim 26, in which the shaft member carries a tubular member contacting the hip belt.

28. A seat-belt system according to claim 26, in which the stopper member comprises a frictional member attached to said arm.

29. A seat-belt system according to claim 1, in which the driving means comprises a rack which is supported by either of the door and the car body to which the door is hinged so as to be longitudinally slidable, with one end thereof connected to the other of the door and car body, a pinion pivoted to either of the door and car body so as to engage with said rack, and interlocking means for moving the pinion, run-through means and shoulder-belt anchor in proper sequence, so that relative displacement of the rack with respect to either of the door and car body, resulting from the opening and closing of the door, moves the run-through means and shoulder-belt anchor.

30. A seat-belt system according to claim 29, in which one end of the rack is pivoted to the other of the door and car body through a link.

31. A seat-belt system according to claim 30, in which the link comprises a first link whose one end is pivoted to the rack and a second link whose one end is pivoted to the other end of the first link and other end to the other of the door and car body, so that the first and second links are bent, with the pivoted joint thereof guided by a link guide provided on either of the door and car body, when the door moves from the fully closed position to a given partially opened position, the rack stops coming in contact with a stopper provided on either of the door and car body when the door has reached the given partially opened position, and displacement between one end of the first link and the other end of the second link is permitted by the elongation of the pivoted joint of the first and second links when the door moves from the given partially opened position to the fully opened position.

32. A seat-belt system according to claim 29, in which the interlocking means comprises a first and a second driving wheel fixed to a single driving shaft interlocked through an over-drive gear to said pinion, a first cable driven by the first driving wheel and connected to the run-through means, and a second cable driven by the second driving wheel and connected to the shoulder-belt anchor.

33. A seat-belt system according to claim 32, in which the run-through means is adapted to move to the front of the first guide when the first cable is pulled by the first driving wheel.

34. A seat-belt system according to claim 32, in which the diameter ratio of the first driving wheel to the second driving wheel is substantially equal to the moving range ratio of the run-through means to the shoulder-belt anchor.

35. A seat-belt system according to claim 1, in which the first guide comprises a tubular member, with a longitudinal slit opening toward the car interior, fastened to the inner panel of the door, and a cable, moved by the driving means as the door opens and closes, that runs therethrough.

36. A seat-belt system according to claim 35, in which the tubular member is disposed in a recess formed in the inner panel, with both edges of the slit extended toward the car interior, then bent substantially parallel to the inner panel so as to hold down a trim attached to the surface of the inner panel.

37. A seat-belt system according to claim 1, in which the second guide is disposed in a gap substantially opening downward, with the roof rail constituting at least one wall thereof.

38. A seat-belt system according to claim 37, in which the gap is formed by the roof rail and a ceiling lining whose side is supported by the roof rail through a bracket, suitably spaced away from the roof rail toward the car interior.

39. A seat-belt system according to claim 37, in which the gap is formed by the lower end of the roof rail and a weather strip that is fastened to an outer and upper part relative to the lower end of the roof rail and contacts the glass in the door.

40. A seat-belt system according to claim 1, in which the second guide has a tubular part made of a plate and having longitudinal slits on both sides thereof, and a roller rotatably attached to the shoulder-belt anchor rotatingly moves therethrough.

41. A seat-belt system according to claim 1, in which the shoulder-belt anchor, when positioned in the rear part of the second guide, is prevented from moving in case of emergency by locking means fastened to the car body behind the second guide for locking the shoulder-belt anchor at the rear part of the second guide.

* * * * *